March 16, 1965    C. F. B. SHATTOCK ETAL    3,173,727
DUAL STATION BRAKE CONTROL SYSTEM
Filed Dec. 5, 1962
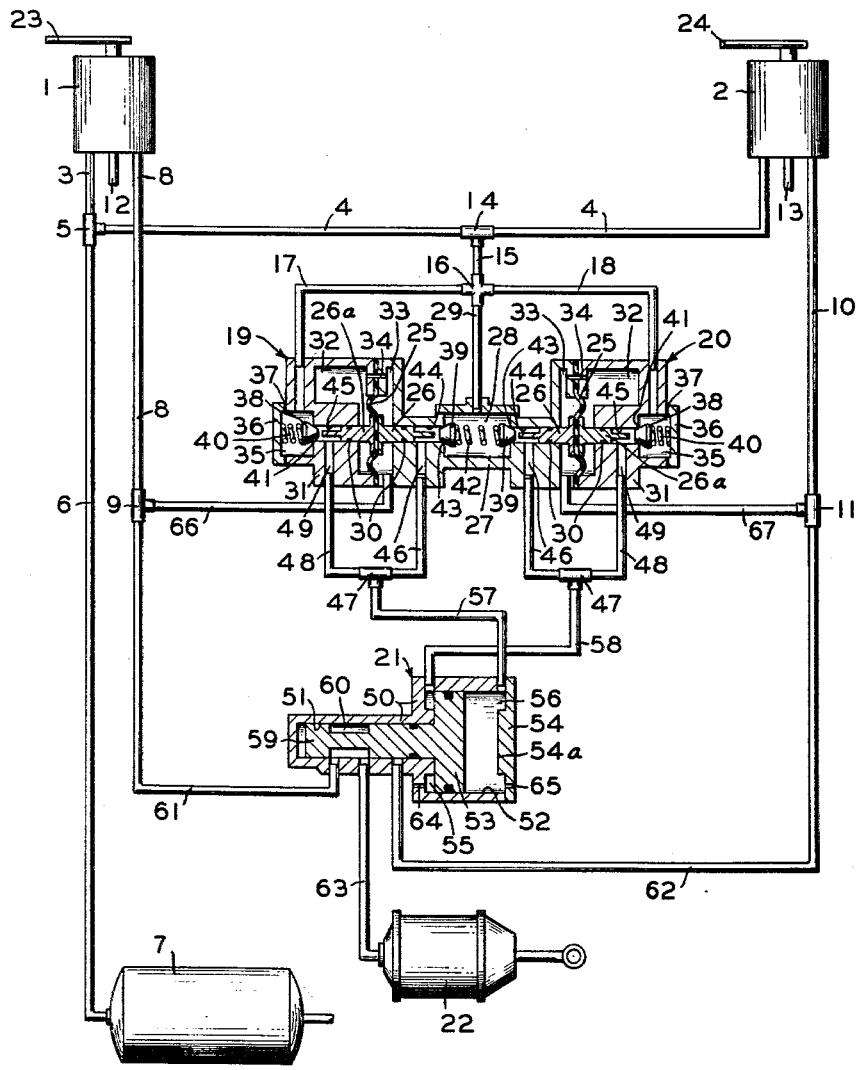
INVENTORS
CHARLES F. B. SHATTOCK
CYRIL J. STONE
BY
*A. G. Steinmiller*
ATTORNEY

3,173,727
DUAL STATION BRAKE CONTROL SYSTEM
Charles F. B. Shattock and Cyril J. Stone, King's Cross, London, England, assignors to Westinghouse Brake & Signal Company, Ltd., London, England
Filed Dec. 5, 1962, Ser. No. 242,488
Claims priority, application Great Britain, Feb. 1, 1962, 3,860/62
8 Claims. (Cl. 303—13)

This invention relates to improvements in fluid pressure control apparatus, and more particularly to a two-station control apparatus for controlling the brakes on a railway locomotive from either one of the two control stations such that, for example, the controlling pressure of either of the two stations may be augmented, held, or reduced, if desired, from the other station.

Such dual brake control apparatus is particularly suitable for railway locomotives intended for shunting or shifting operations. Such locomotives have respectively on the left-hand and right-hand side of the cab a brake valve for controlling the brake so that whichever position the engineer is in, he may apply or release the brakes independently of the position that the brake valve handle at the other control stations may occupy.

The coupling between the two control stations is conveniently effected by fluid pressure operable means, and it is to be understood that the invention is applicable both to compressed fluid (e.g. compressed air) or vacuum operated apparatus, and references herein to "pressure" are to be regarded as implying sub-atmospheric as well as super-atmospheric pressure, insofar as the context permits.

Accordingly, the present invention provides apparatus comprising two brake valve devices each of which is connected to a source of fluid under pressure, and each having a respective outlet and exhaust connection. The supply and exhaust connections are arranged for coupling to a setting valve means adapted, in turn, to control a change-over valve device operable to divert fluid under pressure to an operating cylinder in accordance with the position of whichever brake valve device may then be in use.

The brake valve device may comprise the usual engineer's brake valve device and the operating cylinder may be the usual brake cylinder or cylinders found on a railway locomotive.

More specifically, each setting valve device comprises a diaphragm or piston member separating the valve body into two chambers, interconnected by a choke and preferably of different volumes, stems on each side of the diaphragm or piston members being arranged to actuate associated inlet valves upon movement of said member resulting from a pressure differential established on the diaphragm or piston member.

The change-over valve device comprises a piston or diaphragm member which is adapted to be connected on each side to one of the setting valves and, in turn, arranged to control a change-over valve stem which, depending upon its position, permits connection of one or the other of the engineer's brake valves to the brake cylinder device.

The invention will now be described, by way of example only, with reference to the accompanying drawing which illustrates a preferred embodiment thereof.

The locomotive brake apparatus illustrated comprises two engineer's brake valve devices 1 and 2 which may be of a simple type such as a straight air brake valve device which necessarily does not have to be of the self-lapping type. The brake valve devices 1 and 2 are connected respectively by pipes 3 and 4 to a pipe T 5 which, in turn, is connected by a pipe 6 to a main reservoir 7 which may be charged by fluid under pressure from the usual air compressor (not shown) found on the locomotive. The engineer's brake valve device 1 is provided with a delivery port which is connected by a pipe 8 to a pipe T 9. Likewise, the engineer's brake valve device 2 has a delivery port that is connected by a pipe 10 to a pipe T 11. The engineer's brake valve device 1 is provided with an exhaust port connected to a pipe 12 that is open to the atmosphere. Likewise, the engineer's brake valve device 2 has an exhaust port that is connected by a pipe 13 to the atmosphere.

Disposed in the pipe 4 between the brake valve device 2 and the pipe T 5 is a pipe T 14, the outlet connection of which is connected by a pipe 15 to a pipe cross 16. Two opposite connections of the pipe cross 16 are connected respectively by pipes 17 and 18 to two setting valve devices 19 and 20. The setting valve device 19 is associated with the brake valve device 1, and the setting valve device 20 is associated with the brake valve device 2. As shown in the drawing, the setting valve devices 19 and 20 are embodied in a sectionalized casing for convenience.

The two setting valve devices 19 and 20 are so arranged that, in turn, they control a change-over valve device 21 which, in turn, controls the supply of fluid under pressure to a brake cylinder device 22 in accordance with the position of an operating handle 23 of the engineer's brake valve device 1 or an operating handle 24 of the engineer's brake valve device 2 according to whichever of the engineer's brake valve devices 1 or 2 is being operated at the time.

The setting valve devices 19 and 20 are identical and each comprises a diaphragm 25 which is secured by any suitable means to two stems 26 and 26a disposed respectively on the opposite sides thereof.

The stems 26 and 26a of the respective setting valve devices 19 and 20 are arranged in opposed coaxial relation and slidably mounted in corresponding coaxial bores formed in a common casing section 27. The bores in the casing 27 in which the stems 26 are slidably mounted open into a common chamber 28 formed in the casing section 27. The chamber 28 is connected by a pipe 29 to the pipe cross 16 so that the chamber 28 is constantly charged with fluid under pressure from the main reservoir 7 via pipe 6, pipe T 5, pipe 4, pipe T 14, pipe 15, pipe cross 16, and the pipe 29.

Each of the stems 26 and 26a of each of the setting valve devices 19 and 20 is provided with a peripheral annular groove in which is disposed an O-ring seal 30.

The diaphragm 25 of each of the respective setting valve devices 19 and 20 is clamped between one end of the casing section 27 and an adjacent end of a casing section 31. The diaphragm 25 cooperates with the casing section 27 and the casing section 31 to form on the opposite sides of the respective diaphragm two chambers 32 and 33. The respective chambers 32 and 33 of the respective setting valve devices 19 and 20 are connected by a choke 34. As will be seen from the drawing, the capacity of the chamber 32 is larger than the capacity of the chamber 33. Formed in each of the casing sections 31 is a chamber 35, the open end of which is closed by a cover member 36, there being a sealing gasket 37 interposed between each of the covers 36 and the corresponding casing section 31. Each of the setting valve devices 19 and 20 comprises two inlet valves 38 and 39 which are disposed respectively in the chambers 35 and 28. Disposed between each of the valves 38 and the corresponding cover 36 is a light biasing spring 40 urging the respective valve 38 into contact with an annular valve seat 41. Disposed in the chamber 28 and interposed between the two valves 39 is a spring 42 for urging each of the valves 39 into contact with a corresponding annular valve seat 43 formed at one end of a corresponding bore 44 which extends from the chamber 28 through the casing section 27 and opens into the corresponding chamber 33. As shown in the drawing, the stem 26 of each of the setting valve devices 19 and 20 is slidably mounted in the corresponding bore 44 so that upon deflection of the diaphragm 25 in the direction of the corresponding valve 39 the stem 26 is effective to unseat this valve against the yielding resistance of the spring 42. As shown in the drawing, the chambers 32 and 35 of each of the setting valve devices 19 and 20 are connected by a bore 45 in which is slidably disposed the corresponding stem 26a. Opening at the wall surface of each of the bores 44 intermediate the ends thereof is one end of a passageway 46 which is connected by a pipe bearing the same numeral to one end of a pipe T 47. The opposite end of the pipe T 47 is connected by a pipe 48 to one end of a passageway 49 formed in the respective casing section 41 and opening at its other end at the wall surface of the bore 45 therein intermediate the ends of this bore.

As shown in the drawing, the change-over valve device 21 comprises a casing section 50 having therein a bottom bore 51 and a coaxial counterbore 52. The change-over valve device 21 further comprises a piston 53 which is slidably mounted within the counter 52 in the casing section 50. The piston 53 cooperates with the casing section 50 and a pressure head 54 secured to the open end of the counterbore 52 by any suitable means (not shown) to form on opposite sides of the piston chamber 55 and 56, respectively. The chamber 56 is connected by a pipe 57 to the side outlet of the pipe T 47 that is associated with the setting valve device 19. Likewise, the chamber 55 is connected by a pipe 58 with the side outlet of the pipe T 47 that is associated with the setting valve device 20.

The piston 53 is adapted to control the position of a change-over valve stem 59 formed integral with the piston 53 and slidably disposed in the bottom bore 51. The change-over valve stem 59 is provided intermediate its ends with a peripheral annular groove 60 which, depending upon the position of the change-over valve stem 59 and the piston 53, is effective to connect one or the other of two pipes 61 and 62 to a pipe 63 that is connected to the brake cylinder device 22, it being understood that one end of each of the pipes 61, 62 and 63 open at the wall surface of the bottom bore 51, the location of these openings being such that when the change-over valve stem 59 occupies the position in which it is shown in the drawing, the peripheral annular groove 60 thereon is effective to establish a communication between the pipe 61 and the pipe 63. When the change-over valve stem 59 and the piston 53 are moved in the direction of the right hand from the position in which they are shown in the drawing to a second position defined by a contact of the right-hand side of the piston 53 with the left-hand side of a boss 54a formed on the left-hand side of the pressure head 54, the peripheral annular groove 60 is effective to establish a communication between the pipe and passageway 63 and the pipe and passageway 62.

The other end of the pipe 61 is connected to the pipe T 9 and likewise the other end of the pipe 62 is connected to the T 11.

As shown in the drawing, the chamber 55 is connected to the atmosphere through a choke 64 formed in the casing section 50, and the chamber 56 is open to the atmosphere through a choke 65 formed in the pressure head 54.

The size of the chokes 64 and 65 is made sufficiently small to insure that adequate pressure is maintained in the respective chambers 55 and 56 for a sufficient length of time to effect the movement of the piston 53 from one to the other of its two extreme positions. After the piston 53 has been moved to one or the other of its two positions, one or the other of the chokes 64 and 65 is effective to vent to atmosphere the fluid under pressure in the corresponding chamber 55 or 56.

Alternatively, the chokes 64 and 65 could be so arranged that the appropriate one of these chokes is only uncovered by the piston 53 when this piston reaches nearly the end of its stroke.

Moreover, in order to insure that the change-over valve stem 59 remains in one or the other of its extreme positions when fluid under pressure is released from the chamber 55 or 56, detents may be provided so that shocks encountered in shifting cars in a railway yard and similar operations do not cause movement of the annular valve stem 59 unintentionally.

*Operation*

Assume that both brake valve devices 1 and 2 are in the release position and that the stem 59 and piston 53 of the change-over valve device 21 occupy the position in which they are shown in the drawing. Further assume that the setting valves 19 and 20 occupy the position in which they are shown in the drawing.

Now let it be supposed that the engineer moves the handle 23 of the brake valve device 1 from its release position into an application zone to effect a desired degree of brake application. As the handle 23 is thus moved into its application zone, fluid under pressure will flow from the main reservoir 7 via the pipe 6, pipe T 5 and pipe 3 to the brake valve device 1 and then via the pipe 8, pipe T 9, pipe 61, peripheral annular groove 60 on the change-over valve stem 59, and the pipe 63 to the brake cylinder device 22 to effect an application of brakes. The fluid under pressure thus supplied to pipe 8 will also flow via the outlet connection of pipe T 9 and a pipe 66, one end of which is connected to this outlet of the pipe T 9 and the opposite end of which is connected to the chamber 33.

The fluid under pressure supplied to the chamber 33 in the manner previously explained quickly increases the pressure in this chamber due to the restricted flow of air therefrom provided by the choke 34 that controls the rate of flow from the chamber 33 to the chamber 32. This rapid increase in pressure in chamber 33 is effective to establish a pressure differential on the diaphragm 25 which deflects the diaphragm 25 in the direction of the left hand from the position in which it is shown in the drawing.

The deflection of the diaphram 25 in the direction of the left hand is effective to move the corresponding stem 26a in the same direction until the stem contacts the valve 38. Further deflection of the diaphragm 25 in the direction of the left hand, and movement of the valve stem 26a in the same direction, is effective to unseat the valve 38 against the yielding resistance of the spring 40. Upon movement of the valve 38 out of seating contact with its seat 41, fluid under pressure will flow from the main reservoir 7 via the pipe 6, pipe T 5, pipe 4, pipe T 14, pipe 15, cross 16, pipe 17, chamber 35, bore 45, passageway 49, pipe 48, pipe T 47, and pipe 57 to the chamber 56 in the change-over valve device 21. The fluid under pressure thus supplied to the chamber 56 thus insures that the piston 53 maintains the change-over valve stem 59 in the correct position so that the fluid under pressure supplied to the pipe 61 may flow therefrom via peripheral annular groove 60 on the change-over stem 59 to the pipe 63 and thence to the brake cylinder device 22 to effect a brake application.

The flow of fluid under pressure from the chamber 33 through the choke 34 to the chamber 32 allows the pressure in these two chambers to equalize after a short period of time. Upon equalization of pressure on opposite sides of the diaphragm 25, its inherent resiliency will restore the diaphragm 25 and the stem 26a to the position in which they are shown in the drawing thereby allowing the spring 40 to move the valve 38 into contact with annular valve seat 41 thereby cutting off flow of fluid under pressure from the chamber 35 to the chamber 56 in the change-over valve device 21. Upon seating of the valve 38 on annular valve seat 41, the fluid under pressure present in the chamber 56 will be slowly vented therefrom via the choke 65 to the atmosphere. All the valves shown in the drawing will now be in the position in which they are shown.

If the engineer desires to increase the degree of brake application, he may do so by moving the handle 23 of the engineer's brake valve device 1 farther into the application zone whereupon fluid under pressure will again be supplied to the brake cylinder device 22 and the chamber 33 in the manner hereinbefore explained in detail. The fluid under pressure thus supplied to the chamber 33 will deflect the diaphragm 25 and unseat the valve 38 against the yielding resistance of the spring 40 in the manner hereinbefore explained so that fluid under pressure will again be supplied from the main reservoir 7 to the chamber 56 of the change-over valve device 49.

Let it now be supposed that the engineer desires to release the brake application. It will be remembered, as hereinbefore explained, that the choke 34 allows equalization of pressure between the chamber 33 and the chamber 32 subsequent to the build-up of pressure in the chamber 33. Therefore, to release the brakes the engineer will move the handle 23 of the brake valve device 1 from whatever position it occupies in its application zone in the direction of its release position. As the handle 23 is thus moved toward its release position, the engineer's brake valve device 1 operates to effect a reduction of the pressure in the chamber 33 so that the pressure in this chamber will be quickly reduced below the pressure in the chamber 32 since the choke 34 restricts the rate of flow of fluid under pressure from the chamber 32 to the chamber 33. This reduction of the pressure in the chamber 33 below the pressure in the chamber 32 is effective to establish a differential of pressure on the diaphragm 25 which is effective to deflect the diaphragm 25 in the direction of the right hand and thereby move the stem 26 in this same direction. The deflection of the diaphragm 25 in the direction of the right hand is effective through the stem 26 to move the right-hand end of the stem 26 into contact with the inlet valve 39 and, as the diaphragm continues to be deflected in the direction of the right hand, effects unseating of the valve 39 from the annular valve seat 43 against the yielding resistance of the spring 42. Upon unseating of the valve 39 from the annular valve seat 43, fluid under pressure in the chamber 28, which pressure is the same as that in the main reservoir 7, will flow from the chamber 28 past the unseated valve 39, thence via bore 44, passageway and pipe 46, pipe T 47, and pipe 57 to the chamber 56 in the change-over valve device 21. The fluid under pressure present in the chamber 32 will flow through the choke 34 to the chamber 33 until the pressure in the chamber 32 and chamber 33 equalize, whereupon the inherent resiliency of the diaphragm 25 will return this diaphragm and the stem 26 to the position in which they are shown in the drawing. As the stem 26 is returned to the position in which it is shown in the drawing, the spring 42 is effective to move the valve 39 into contact with the annular valve seat 43 to close communication between the chamber 28 and the chamber 56 in the change-over valve device 21. Subsequent to seating of the valve 39, the fluid under pressure present in chamber 56 will again leak or be vented to the atmosphere via the choke 65 in the pressure head 54.

Let is now be supposed that the engineer moves his position to the other side of the cab of the locomotive where the engineer's brake valve device 2 is located and let it be supposed that he now desires to effect the application of the brakes. To do so, he will move the handle 24 of the brake valve device 2 from its release position into its application zone to a position corresponding with the degree of brake application desired. Upon movement of the handle 24 of brake valve device 2 to some position in its applicaiton zone, fluid under pressure will flow from the main reservoir 7 to the chamber 33 in the setting valve device 20 via the pipe 6, pipe T 5, pipe 4, pipe T 14, engineer's brake valve device 2, pipe 10, pipe T 11 and a pipe 67, which has one end connected to the outlet of the pipe T 11 and the opposite end connected to the chamber 33. The fluid under pressure thus supplied to the pipe 10 also flows through the pipe T 11 and pipe 62 to the change-over valve device 21. It will be noted from the drawing that while the change-over valve stem 59 occupies the position in which it is shown in the drawing, it is effective to close communications between the pipe 62 and the pipe 63. Consequently, fluid under pressure cannot flow from the pipe 62 to the pipe 63 while the change-over valve stem 59 remains in the position in which it is shown in the drawing.

The fluid under pressure that is supplied to the chamber 33 of the setting valve device 20, as above explained, cannot flow through the choke 34 in the setting valve device 20 to the chamber 32 as fast as it is being supplied to the chamber 33. Consequently, a pressure differential is established on the diaphragm 25 of setting valve device 20 to effect deflection of the diaphragm 25 of the setting valve device 20 in the direction of the right hand from the position in which it is shown in the drawing. This deflection of the diaphragm 25 in the direction of the right hand is effective through the stem 26a of the setting valve device 20 to unseat the valve 38 of the setting valve device 20 against the yielding resistance of the spring 40. Fluid under pressure is supplied from the main reservoir 7 via the pipe 6, pipe T 5, pipe 4, pipe T 14, pipe 15, cross 16, and pipe 18 to the chamber 35 of the setting valve device 20. Therefore, upon unseating of the valve 38 from its seat 41, fluid under pressure will flow from the chamber 35 past the unseated valve 38 and through the bore 45 of the setting valve device 20, passageway 49 and pipe 48, pipe T 47, and pipe 58 to the chamber 55 of the change-over valve device 21. The fluid under pressure thus supplied to the chamber 55 is effective to move the piston 53 and thereby the change-over valve stem 59 which is integral with the piston in the direction of the right hand until the right-hand face of the piston 53 abuts the boss 54a on the pressure head 54. Upon movement of the piston 53 and the change-over valve stem 59 to this position, the peripheral annular groove 60 on the annular valve stem 59 establishes a communication between the pipe 62 and the pipe 63 whereupon the fluid under pressure supplied to the pipe 62 by the engineer's brake valve device 2 will flow therefrom via the peripheral annular groove 60 on the change-over valve stem 59 and the pipe 63 to the brake cylinder device 22 to effect an application of the brake.

It will thus be seen that whichever brake valve device 1 or 2 the engineer is operating at the time, or if he moves from the position at which the brake valve 1 is located to the position at which the brake valve 2 is located, any movement of the handle 23 of the brake valve device 1 or the handle 24 of the brake valve device 2 will enable him to retain or take over control or to reduce, increase, or retain the pressure in the brake cylinder device 22.

Having now described the invention, what we claim as new and desire to secure by Letters Patent, is:

1. A fluid pressure brake control system for controlling braking of a locomotive from a plurality of control stations, said system comprising:
   (a) a fluid pressure storage reservoir,
   (b) a fluid pressure actuated device operative to effect a brake application and a brake release on the locomotive,
   (c) a manually operable control valve device for each of a plurality of separate control stations, each operable to effect the supply of fluid under pressure from said storage reservoir to said fluid pressure actuated device to effect a brake application and the release of fluid under pressure from said fluid pressure actuated device to effect a brake release, (d) a multi-position change-over valve means effective in one poistion to establish a first fluid pressure communication between the manually operable control valve device located at one of the control stations and said fluid pressure actuated device and effective in another position to close said first fluid pressure communication and to establish a second fluid pressure communication between the manually operable control valve device located at another of the control stations and said fluid pressure actuated device, and (e) a fluid pressure responsive valve device for each of said manually operable control valve devices, each operable solely in response to variation of the pressure of the fluid supplied by a corresponding one of the manually operable control valve devices to effect the supply of fluid under pressure from said fluid pressure storage reservoir to said multi-position change-over valve device to effect the operation thereof to the one of its positions corresponding to the manually operable control valve device last operated.

2. A fluid pressure brake control system for controlling braking of a locomotive from a plurality of control stations, as claimed in claim 1, further characterized by timing means for causing each fluid pressure responsive valve device to be operable in response to fluid under pressure supplied by the manually operable control valve device for the corresponding control station to effect the supply of fluid under pressure from said fluid pressure storage reservoir to said multi-position change-over valve device for a limited time.

3. A fluid pressure brake control system for controlling braking of a locomotive from a plurality of control stations, as claimed in claim 2, further characterized in that said multi-position change-over valve means comprises fluid pressure responsive means for actuating it to the one or the other of its two positions and by means for releasing to atmosphere at a restricted rate fluid under pressure supplied to said fluid pressure responsive means.

4. A fluid pressure brake control system for controlling braking of a locomotive from a plurality of control stations, as claimed in claim 2, further characterized in that each fluid pressure responsive valve device is operable in response to a reduction of pressure in said fluid pressure actuated device effected by the manually operated control valve device for the corresponding control station to effect the supply of fluid under pressure from said fluid pressure storage reservoir to said multi-position change-over valve device to insure that said multi-position change-over valve device cannot be moved from its existing position for a chosen length of time.

5. A fluid pressure brake control system for controlling braking of a locomotive from a plurality of control stations, as claimed in claim 1, further characterized in that each of said fluid pressure responsive valve devices comprises two valves, one valve being operable to supply fluid under pressure from said fluid pressure storage reservoir to said multi-position change-over valve upon operation of the corresponding one of said manually operable control valve devices to effect an increased degree of brake application and the other being operable to supply fluid under pressure from the fluid pressure storage reservoir to said multi-position change-over valve upon operation of the corresponding one of said manually operable control valve devices to effect a decreased degree of brake application.

6. A fluid pressure brake control system for controlling braking of a locomotive from a plurality of control stations, as claimed in claim 1, further characterized in that each of said fluid pressure responsive valve devices comprises:

(a) a movable abutment, (b) two valves, one of which is operable upon the establishment of a differential fluid pressure force on one side of said movable abutment responsively to one operation of the corresponding manually operable control valve device to effect the supply of fluid under pressure from said fluid pressure storage reservoir to said multi-position change-over valve, and the other of which is operable upon the establishment of a differential fluid pressure force on the other side of said movable abutment responsively to a different operation of the corresponding manually operable control valve device to effect the supply of fluid under pressure from said fluid pressure storage reservoir to said multi-position change-over valve, and (c) restricted port means connecting opposite sides of said movable abutment for establishing for a limited time a differential fluid pressure force on said abutment.

7. Fluid pressure control apparatus for controlling the pressure in a control chamber from any one of a plurality of different locations, said apparatus comprising:

(a) a plurality of control valve devices, respectively located at different stations, each control valve device having a fluid pressure inlet, a fluid pressure outlet, and an exhaust port, (b) a source of fluid pressure supply connected to the fluid pressure inlet of each control valve device, and (c) changeover valve means including:
(i) at least two movable abutments each having a chamber on each side thereof,
(ii) choke means providing restricted communication between the chambers on opposite sides of each abutment, each abutment being thereby subjected to a differential fluid pressure force upon the supply of fluid pressure from the fluid pressure outlet of a corresponding one of the said control valve devices to a chamber at one side thereof, equalization of pressure in the two chambers occurring upon elapse of a given time via said choke means, and
(iii) valve means operative responsively to the movement of one or another of said movable abutments to establish a communication via which fluid pressure from the fluid pressure outlet of the corresponding control valve device is supplied to the control chamber and via which fluid under pressure is released from the control chamber under the control of the control valve device through its said exhaust port.

8. Fluid pressure brake control apparatus for controlling the pressure in a brake control chamber from any one of a plurality of different locations on a vehicle, said apparatus comprising:

(a) a plurality of brake control valve devices, respectively located at different stations on the vehicle, each control valve device having a fluid pressure inlet, a fluid pressure outlet, and an exhaust port, (b) a source of fluid pressure supply connected to the fluid pressure inlet of each control valve device, and (c) changeover valve means including:
(i) at least two movable abutments each having a chamber on each side thereof,
(ii) choke means providing restricted communication between the chambers on opposite sides of each abutment, each abutment being thereby subjected to a differential fluid pressure force upon the supply of fluid pressure from the fluid pressure outlet of a corresponding one of the said control valve devices to a chamber at one side thereof, equalization of pressure in the two chambers occurring upon elapse of a given time via said choke means, and
(iii) valve means operative responsively to the movement of one or another of said movable abutments to establish a communication via which fluid pressure from the fluid pressure outlet of the corresponding brake control valve device is supplied to the brake control chamber and via which fluid under pressure is released from the brake control chamber under the control of the brake control valve device through its said exhaust port.

References Cited by the Examiner
UNITED STATES PATENTS 3,018,137  1/62  Shattock et al. _____ 303—14

ARTHUR L. LA POINT, *Primary Examiner.*
EUGENE G. BOTZ, *Examiner.*